July 7, 1925.
A. F. MASURY
1,545,057
CUSHION CONNECTION FOR VEHICLE CONSTRUCTION
Filed April 24, 1923      2 Sheets-Sheet 1
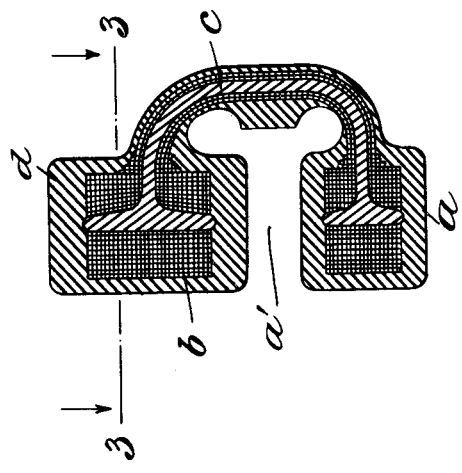
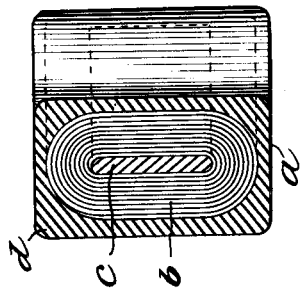
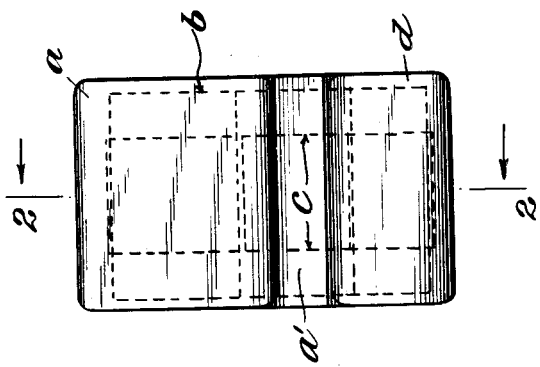
INVENTOR
Alfred F. Masury
BY
Redding Greeley Shea + Campbell
ATTORNEYS.

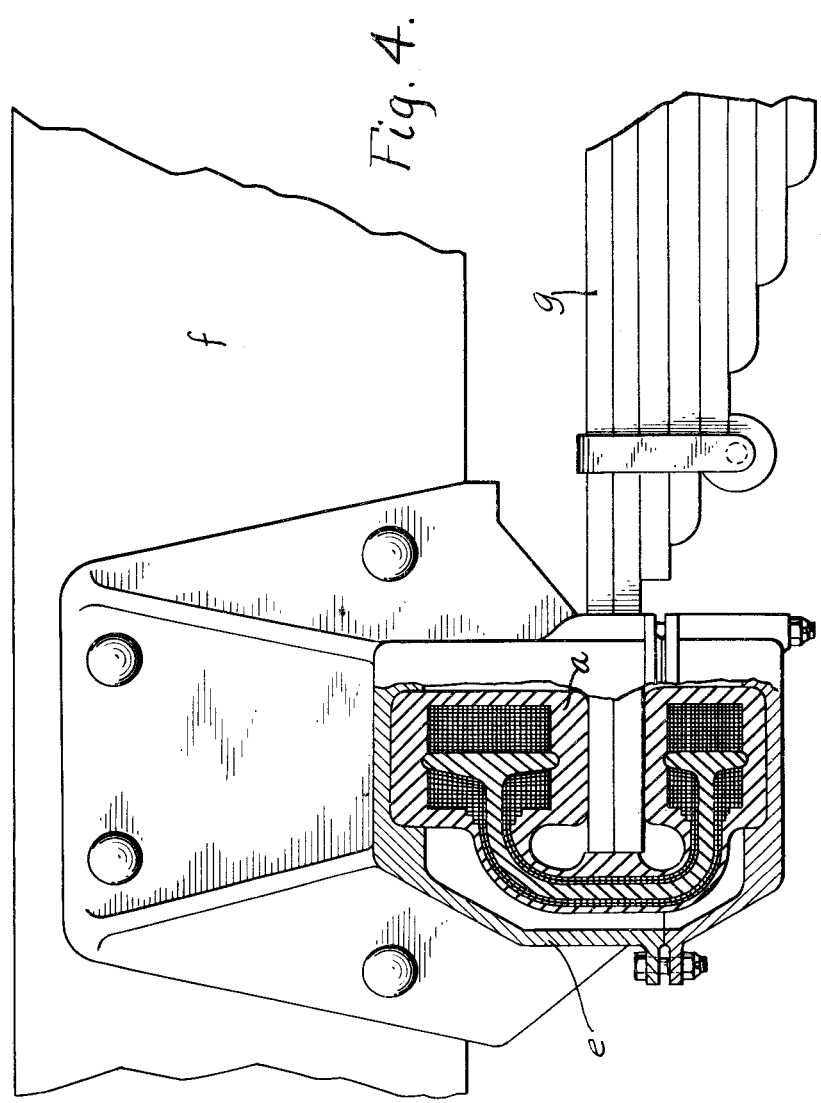

Patented July 7, 1925.

1,545,057

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed April 24, 1923. Serial No. 634,226.

*To all whom it may concern:*

Be it known that I, ALFRED F. MASURY, a citizen of the United States, residing in the borough of Manhattan of the city of New York, in the State of New York, have invented certain new and useful Improvements in Cushion Connections for Vehicle Construction, of which the following is a specification, reference being had to the accompanying drawing, forming a part hereof.

This invention relates generally to the type of connection shown, described and claimed broadly in Letters Patent of the United States No. 1,404,876 dated January 31, 1922. While such connections are to be considered broadly as of non-metallic yielding material, in the present development of the art it will be sufficient to refer specifically to rubber, by way of example. Rubber under compression or in tension is unique in its ability to absorb vibrations. This ability roughly speaking, is proportonal to the extent to which the rubber is stressed. As a practical yielding connection for the transmission of mechanical stresses then, it is desirable to place the rubber under a static load. When so loaded it best serves its purpose of returning all the energy of impacts thereon. In said Patent No. 1,404,876 this static load is applied by confining the block under compression within a housing. By the present improvements it is proposed to form a self-contained unit which is built up with the material under static load. More particularly, the invention is concerned with the provision of a connecting unit for the purpose described which is composed of strands of rubber wound under tension by which the condition of compression is set up internally and permanently thereby creating a static load well adapted to absorbing power and returning it in accordance with the well known characteristics of rubber. In accordance with the invention it is proposed to build up the improved unit by threads of rubber wound under tension on a suitable flexible core and securing the parts in permanent relation.

The invention is not to be limited to the particular form of the unit thus constructed nor to the manner in which it is used nor to the means for confining the strands in their wound up relation. Reference is to be had to the accompanying drawings for one suitable embodiment of the invention which illustrates the construction of a block adapted for use as a non-metallic yielding shackle to connect the spring and frame of a motor vehicle. In the drawings:

Figure 1 is a view in end elevation of the improved block.

Figure 2 is a view in vertical section taken through the block shown in Figure 1 on the plane indicated by the line 2—2 and looking in the direction of the arrows.

Figure 3 is a transverse sectional view taken on the plane indicated by the line 3—3 of Figure 2 and looking in the direction of the arrows.

Figure 4 is a fragmentary view in elevation and partly in section showing the application of the invention as a connection and support between the spring and frame in a vehicle.

As indicated hereinbefore, the underlying thought in the present invention resides in the construction of a connection for the purpose described in which the internal mass shall be maintained under static load by virtue of the construction rather than through external forces. A unit of such construction has physical properties which best adapt it to return the energy absorbed by vibrations and blows and is durable in the mechanical sense for the transmission of stresses. Further, when interposed operatively between two metallic parts the method of attachment is of no concern in that the attaching means need not be relied upon to place the material under static load. As shown most clearly in Figure 2 the block $a$ is formed of such a shape as to receive, for instance, a vehicle spring in the opening $a'$ formed therein for reasons which appear in the aforenamed Patent No. 1,404,876. The block $a$ as illustrated has been built up by means of threads or strands of rubber $b$ wound under tension on a flexible core $c$ illustrated as a core of rubber of any approved size and shape. With the threads $b$ thus wrapped under tension the internal mass of the body is placed permanently under a static load. The threads are confined in permanent relationship in any suitable way as, for instance, by placing theme in a mould with an outer casing $d$ of rubber which may be permanently united therewith to form the finished non-metallic yielding block. The effect of winding the strands $b$ under tension is, in effect, to place the greater part of the internal mass under compression by means which are self-contained, that is, without the aid of external clamping devices. Elaboration on the advantages of maintaining the material in such condition is unnecessary since, in use, it has been found that the rubber is more effective for the purpose intended both from a mechanical standpoint and from the standpoint of its yielding properties. One application of the invention, as a connection and support between the spring and the chassis frame of a vehicle is indicated in Figure 4. The connection is illustrated as disposed within a housing *e* carried with the vehicle frame *f*. The housing is formed with an opening through which the end of a vehicle spring *g* extends to be engaged by the connection *a*. It will be understood that the application of the invention is not to be deemed limited to the use illustrated in Figure 4 but is equally applicable in any situation as a connection and support between two mechanical parts which are to be connected with provision for cushioning shocks and stresses.

Other types of cores may be employed and, indeed, it may be possible to omit the core and other ways of confining the strands under tension may be used without departing from the spirit of the invention so long as a connecting unit having the described properties is obtained.

What I claim is:

1. A wholly non-metallic connection and support adapted to be interposed between two metallic parts of a motor vehicle including a block made up of a core, a built-up body consisting of strands wound under tension on the core, and a casing for the strands to confine them permanently under an internal static load.

2. A wholly non-metallic connection and support adapted to be interposed between two metallic parts of a motor vehicle comprising two connected blocks made up of a core of yielding material, strands of rubber wound thereon under tension and a rubber envelope united with the strands to confine them permanently under tension.

3. A wholly non-metallic connection and support adapted to be interposed between a spring and a motor vehicle frame comprising a U-shaped core of yielding material, strands of rubber wound thereon under tension and a rubber casing for the strands to confine them permanently under an internal static load.

4. A spring connection and support comprising a U-shaped unit under a self-imposed internal static load consisting of a U-shaped core of yielding material, strands of rubber wound thereon under static load and a rubber envelope to confine the strands under said self-imposed static load.

5. A spring connection and support comprising a U-shaped core of yielding material, strands of rubber wound thereon under tension to set up a self-imposed internal static load and a rubber envelope to confine the strands under such self-imposed static load, built up to form a U-shaped unit consisting of two blocks and a neck therebetween of smaller cross sectional area than the blocks.

6. In combination, a block adapted to be interposed between a metallic part of a vehicle frame and a spring made up of a core of yielding material, strands of rubber wound thereon under tension, and a rubber envelope to confine the strands under tension, a second block interposed between a second metallic part of the vehicle frame and the spring made up of a core of yielding material, strands of rubber wound thereon under tension, and a rubber envelope to confine the strands under tension, a connection of smaller cross section than either of the blocks between the blocks adapted to be engaged by the end of the spring made up of a core of yielding material, strands of rubber wound thereon under tension, and a rubber envelope to confine the strands under tension, the whole comprising a self-contained U-shaped unit under a self-imposed internal static load.

This specification signed this 20th day of April A. D. 1923.

ALFRED F. MASURY.